(12) United States Patent
Cho et al.

(10) Patent No.: US 9,309,951 B1
(45) Date of Patent: Apr. 12, 2016

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-Si (KR);
Kangsoo Seo, Yongin-Si (KR);
Seongwook Hwang, Gunpo-Si (KR);
Jaechang Kook, Hwaseong-Si (KR);
Seongwook Ji, Ansan-Si (KR);
Myeonghoon Noh, Seongnam-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/557,226

(22) Filed: Dec. 1, 2014

(30) Foreign Application Priority Data

Sep. 23, 2014 (KR) .......................... 10-2014-0126795

(51) Int. Cl.
*F16H 3/62* (2006.01)
*F16H 3/66* (2006.01)
*F16H 3/44* (2006.01)

(52) U.S. Cl.
CPC ............ *F16H 3/66* (2013.01); *F16H 2003/445* (2013.01); *F16H 2200/0069* (2013.01); *F16H 2200/0082* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 7,967,715 B2 * | 6/2011 | Hart | ........................... F16H 3/66 475/275 |
| 8,007,394 B2 * | 8/2011 | Phillips | ..................... F16H 3/66 475/275 |

(Continued)

*Primary Examiner* — Dirk Wright
(74) *Attorney, Agent, or Firm* — Morgan, Lewis & Bockius LLP

(57) ABSTRACT

A planetary gear train of an auto transmission for a vehicle may include an input shaft, four planetary gear sets, eight rotational shafts and six friction elements. The rotational shafts connect rotation elements of corresponding first, second, third, and/or fourth planetary gear sets, and one or more rotational shafts are directly or selectively connected to an output shaft or a transmission housing. The six friction elements selectively connect the rotational shafts and selectively connect one or more rotational shafts with the transmission housing.

5 Claims, 13 Drawing Sheets

(56) References Cited

U.S. PATENT DOCUMENTS

| | | | | |
|---|---|---|---|---|
| 8,202,190 B2* | 6/2012 | Phillips | F16H 3/66 | 475/275 |
| 8,333,676 B2* | 12/2012 | Kim | F16H 3/666 | 475/277 |
| 8,357,069 B2* | 1/2013 | Diemer | F16H 3/66 | 475/289 |
| 8,465,390 B2* | 6/2013 | Brehmer | F16H 3/66 | 475/282 |
| 8,545,362 B1* | 10/2013 | Goleski | F16H 3/66 | 475/277 |
| 8,574,113 B1* | 11/2013 | Goleski | F16H 3/66 | 475/282 |
| 8,663,055 B2 | 3/2014 | Brehmer et al. | | |
| 8,690,722 B2* | 4/2014 | Phillips | F16H 3/66 | 475/280 |
| 8,777,798 B2* | 7/2014 | Borgerson | F16H 3/66 | 475/275 |
| 8,834,310 B2* | 9/2014 | Goleski | F16H 63/3026 | 192/48.601 |
| 8,876,651 B2* | 11/2014 | Mellet | F16H 3/66 | 475/277 |
| 8,888,648 B2* | 11/2014 | Mellet | F16H 3/66 | 475/275 |
| 8,931,611 B2* | 1/2015 | Goleski | F16H 57/08 | 192/110 R |
| 9,022,894 B2* | 5/2015 | Goleski | F16D 25/10 | 475/279 |
| 9,028,359 B2* | 5/2015 | Bockenstette | F16H 3/62 | 475/119 |
| 9,039,565 B2* | 5/2015 | Lee | F16H 3/66 | 475/277 |
| 9,103,389 B2* | 8/2015 | Maurer | F16D 25/06 | |
| 9,127,755 B2* | 9/2015 | Goleski | F16H 3/62 | |
| 9,133,915 B2* | 9/2015 | Mellet | F16H 3/62 | |
| 9,145,953 B2* | 9/2015 | Goleski | F16H 3/62 | |
| 2014/0087910 A1* | 3/2014 | Thomas | F16H 57/08 | 475/269 |
| 2014/0110209 A1* | 4/2014 | Goleski | F16D 48/0206 | 192/48.601 |
| 2014/0113761 A1* | 4/2014 | Goleski | F16D 25/0638 | 475/269 |

* cited by examiner

FIG. 2

|      | B1 | B2 | C1 | C2 | C3 | C4 | Gear ratio |
|------|----|----|----|----|----|----|------------|
| 1ST  | ○  | ○  | ○  |    |    |    | 4.964 |
| 2ND  | ○  | ○  |    |    | ○  |    | 2.963 |
| 3RD  |    | ○  | ○  |    | ○  |    | 2.111 |
| 4TH  |    | ○  |    | ○  | ○  |    | 1.780 |
| 5TH  |    | ○  | ○  | ○  |    |    | 1.447 |
| 6TH  |    | ○  | ○  |    |    | ○  | 1.267 |
| 7TH  |    |    | ○  |    | ○  | ○  | 1.000 |
| 8TH  | ○  |    | ○  |    |    | ○  | 0.846 |
| 9TH  | ○  |    | ○  | ○  |    |    | 0.722 |
| 10TH | ○  |    |    | ○  |    | ○  | 0.597 |
| REV  | ○  | ○  |    |    |    | ○  | 5.844 |

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2014-0126795 filed on Sep. 23, 2014, the entire contents of which are incorporated herein for all purposes by this reference.

BACKGROUND OF THE INVENTION

1. Field of the Invention

The present invention relates to an automatic transmission for vehicles, and more particularly, to a planetary gear train of an automatic transmission for vehicles that implements a forward 10-speed by a minimum configuration to improve power transmission performance and fuel efficiency.

2. Description of the Related Art

In recent years, a rise in oil price causes dashing into unlimited competition for enhancing fuel efficiency. As a result, researches into reduction of a weight and the enhancement of the fuel efficiency through downsizing are conducted in the case of an engine and researches for simultaneously securing operability and fuel efficiency competitiveness through multistages are conducted in the case of an automatic transmission.

However, in the automatic transmission, as a transmission step increases, the number of internal components increases, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multistages.

In this aspect, in recent years, 8 and 9-speed automated transmissions tend to be implemented and the research and development of a planetary gear train capable of implementing more transmission steps has also been actively conducted.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a planetary gear train of an automatic transmission for vehicles that implements forward 10-speed and reverse 1-speed transmission steps with a minimum configuration and reduces drag torque by minimizing non-operated friction elements while three friction elements operate in respective transmission steps to improve power transmission performance and fuel efficiency.

Various aspects of the present invention provide a planetary gear train of an automatic transmission for a vehicle, which includes: an input shaft into which power of an engine is input; a first planetary gear set including a first sun gear, a first planetary carrier, and a first ring gear; a second planetary gear set including a second sun gear, a second planetary carrier, and a second ring gear; a third planetary gear set including a third sun gear, a third planetary carrier, and a third ring gear; a fourth planetary gear set including a fourth sun gear, a fourth planetary carrier, and a fourth ring gear; a first rotational shaft configured to connect the first and second sun gears and selectively connected to a transmission housing; a second rotational shaft configured to connect the first and third planetary carriers and the fourth ring gear; a third rotational shaft configured to connect the first ring gear and selectively connected to the transmission housing; a fourth rotational shaft configured to connect the second planetary carrier and directly connected to an output shaft; a fifth rotational shaft configured to connect the second ring gear and the third sun gear; a sixth rotational shaft configured to connect the third ring gear; a seventh rotational shaft configured to connect the fourth sun gear, and selectively connected with the input shaft and selectively connected to the fifth and sixth rotational shafts; an eighth rotational shaft configured to connect the fourth planetary carrier and directly connected with an output shaft and selectively connected with the sixth rotational shaft; and six friction elements selectively connecting the rotational shafts and selectively connecting the first and third rotational shafts with the transmission housing.

Each of the first, second, third, and fourth planetary gear sets may be a single-pinion planetary gear set. The first, second, third, and fourth planetary gear sets may be sequentially disposed on or coupled to the input shaft starting from an engine side.

The sixth friction elements may include a first clutch interposed between the input shaft and the seventh rotational shaft, a second clutch interposed between the sixth rotational shaft and the eighth rotational shaft, a third clutch interposed between the fifth rotational shaft and the seventh rotational shaft, a fourth clutch interposed between the sixth rotational shaft and the seventh rotational shaft, a first brake interposed between the first rotational shaft and the transmission housing, and a second brake interposed between the third rotational shaft and the transmission housing.

Transmission steps implemented by selectively operating the six friction elements may include a first forward transmission step implemented by simultaneously operating the first clutch and the first and second brakes, a second forward transmission step implemented by simultaneously operating the third clutch and the first and second brakes, a third forward transmission step implemented by simultaneously operating the first and third clutches and the second brake, a fourth forward transmission step implemented by simultaneously operating the second and third clutches and the second brake, a fifth forward transmission step implemented by simultaneously operating the first and second clutches and the second brake, a sixth forward transmission step implemented by simultaneously operating the first and fourth clutches and the second brake, a seventh forward transmission step implemented by simultaneously operating the first, third, and fourth clutches, an eighth forward transmission step implemented by simultaneously operating the first and fourth clutches and the first brake, a ninth forward transmission step implemented by simultaneously operating the first and second clutches and the first brake, a tenth forward transmission step implemented by simultaneously operating the second and fourth clutches and the first brake, and a reverse transmission step implemented by simultaneously operating the fourth clutch and the first and second brakes.

According to various aspects of the present invention, forward 10-speed transmission steps and a reverse 1-speed transmission step are implemented by combining four planetary gear sets configured by simple planetary gear sets with six friction elements to improve power transmission performance and fuel efficiency. Drag torque is reduced by minimizing non-operated friction elements while three friction elements operate to decrease a power loss.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective friction elements applied to an exemplary planetary gear train according to the present invention.

DETAILED DESCRIPTION OF THE EMBODIMENTS

Figure 1:
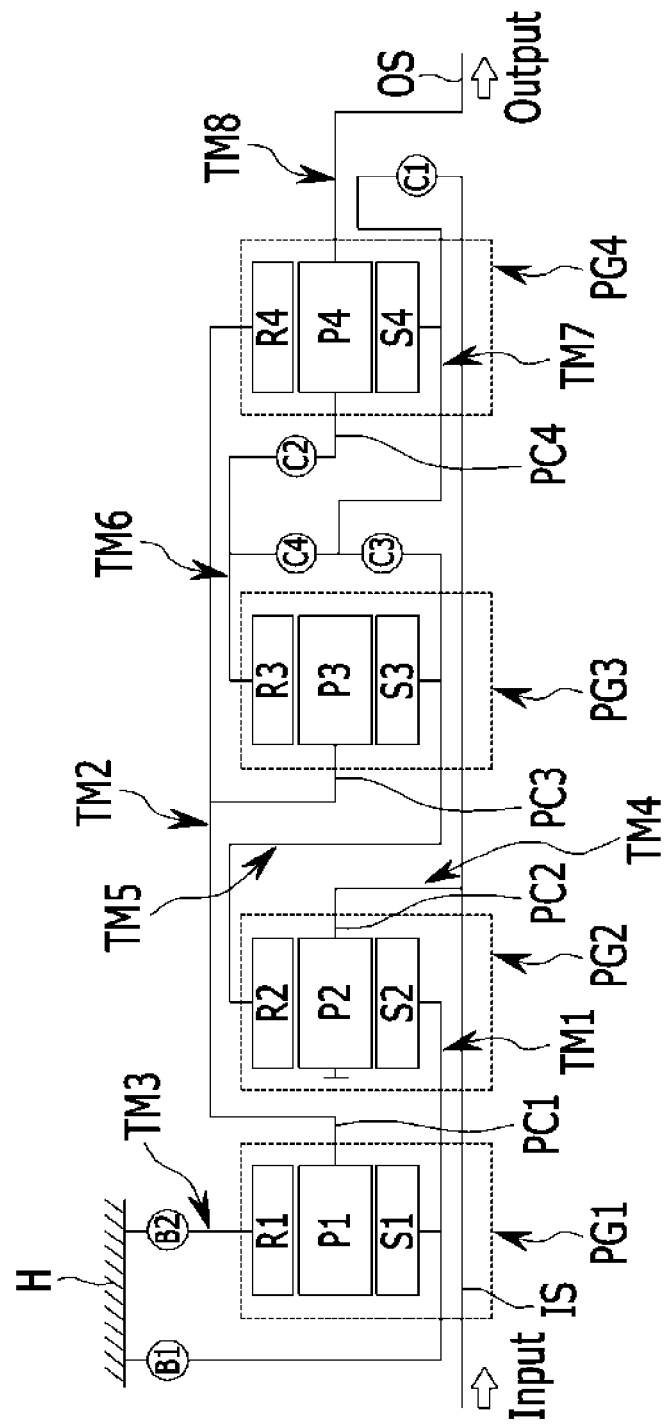
FIG. 1 is a configuration diagram of an exemplary planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

However, parts which are not related with the description are omitted for clearly describing exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a configuration diagram of a planetary gear train according to various embodiments of the present invention. Referring to FIG. 1, the planetary gear train according to various embodiments of the present invention includes an input shaft IS, first, second, third, and fourth planetary gear sets PG1, PG2, PG3, and PG4 disposed on a line of the input shaft IS, an output shaft OS, eight rotational shafts TM1 to TM8 that directly connect respective rotation elements of the first, second, third, and fourth planetary gear sets PG1, PG2, PG3, and PG4 to each other, six friction elements C1 to C4 and B1 and B2, and a transmission housing H.

As a result, rotational power input from the input shaft IS is transmitted by an inter-complementation operation of the first, second, third, and fourth planetary gear sets PG1, PG2, PG3, and PG4 to be output through the output shaft OS.

In addition, the respective simple planetary gear sets are disposed in the order of the first, second, third, and fourth planetary gear sets PG1, PG2, PG3, and PG4 starting from an engine side.

The input shaft IS is an input member and rotational power from a crankshaft of an engine is torque-converted through a torque converter to be input into the input shaft IS.

The output shaft OS as an output member is disposed on the same axial line or coaxially as the input shaft IS to transmit transmitted driving power to a driving shaft through a differential.

The first planetary gear set PG1 as a single-pinion planetary gear set includes a first sun gear S1, a first planetary carrier PC1 that rotatably supports a first pinion P1 which outer-engages with the first sun gear S1, and a first ring gear R1 which inner-engages with the first pinion P1 as rotation elements.

The second planetary gear set PG2 as a single-pinion planetary gear set includes a second sun gear S2, a second planetary carrier PC2 that rotatably supports a second pinion P2 which outer-engages with the second sun gear S2, and a second ring gear R2 which inner-engages with the second pinion P2.

The third planetary gear set PG3 as the single-pinion planetary gear set includes a third sun gear S3, a third planetary carrier PC3 that rotatably supports a third pinion P3 which outer-engages with the third sun gear S3, and a third ring gear R3 which inner-engages with the third pinion P3.

The fourth planetary gear set PG4 as the single-pinion planetary gear set includes a fourth sun gear S4, a fourth planetary carrier PC4 that rotatably supports a fourth pinion P4 which outer-engages with the fourth sun gear S4, and a fourth ring gear R4 which inner-engages with the fourth pinion P4.

In the first, second, third, and fourth planetary gear sets PG1, PG2, PG3, and PG4, one or more rotation elements are directly connected to each other to operate with a total of eight rotational shafts TM1 to TM8.

Configurations of the eight rotational shafts TM1 to TM8 will be described below.

The first rotational shaft TM1 is configured to include, connect or be connected to, the first sun gear S1 and the second sun gear S2, and operates as a fixation element while being selectively connected to the transmission housing H.

The second rotational shaft TM2 is configured to include, connect or be connected to, the first and third planetary carriers PC1 and PC3, and the fourth ring gear R4.

The third rotational shaft TM3 is configured to include, connect or be connected to, the first ring gear R1, and operates as the fixation element while being selectively connected to the transmission housing H.

The fourth rotational shaft TM4 is configured to include, connect or be connected to, the second planetary carrier PC3, and continuously operates as an input element while being directly connected with the input shaft IS.

The fifth rotational shaft TM5 is configured to include, connect or be connected to, the second ring gear R2 and the third sun gear S3.

The sixth rotational shaft TM6 is configured to include, connect or be connected to, the third ring gear R3.

The seventh rotational shaft TM7 is configured to include, connect or be connected to, the fourth sun gear S4, and is selectively connected to the fifth rotational shaft TM5 and the sixth rotational shaft TM6 while being selectively connected with the input shaft IS.

The eighth rotational shaft TM8 is configured to include, connect or be connected to, the fourth planetary carrier PC4, and is directly connected with the output shaft OS while being selectively connected with the sixth rotational shaft TM6 to continuously operate as an output element.

In addition, among the rotational shafts TM1 to TM8, four clutches C1, C2, C3, and C4 which are friction elements are disposed at the input shaft IS or portions where the rotational shafts are selectively connected to each other.

Further, among the rotational shafts TM1 to TM8, two brakes B1 and B2 which are the friction elements are disposed at portions selectively connected to the transmission housing H.

Layout positions of the six friction elements C1 to C4 and B1 to B2 will be described below.

The first clutch C1 is interposed between the input shaft IS and the seventh rotational shaft TM7, and as a result, the input shaft IS and the seventh rotational shaft TM7 are selectively integrated with each other.

The second clutch C2 is interposed between the sixth rotational shaft TM6 and the eighth rotational shaft TM8, and as a result, the sixth rotational shaft TM6 and the eighth rotational shaft TM8 are selectively integrated with each other.

The third clutch C3 is interposed between the fifth shaft TM5 and the seventh rotational shaft TM7, and as a result, the fifth rotational shaft TM5 and the seventh rotational shaft TM7 are selectively integrated with each other.

The fourth clutch C4 is interposed between the sixth rotational shaft TM6 and the seventh rotational shaft TM7, and as a result, the sixth rotational shaft TM6 and the seventh rotational shaft TM7 are selectively integrated with each other.

The first brake B1 is interposed between the first rotational shaft TM1 and the transmission housing H to allow the first rotational shaft TM1 to operate as a selective fixation element.

The second brake B2 is interposed between the third rotational shaft TM3 and the transmission housing H to allow the third rotational shaft TM3 to operate as the selective fixation element.

The respective friction elements constituted by the first, second, third, and fourth clutches C1, C2, C3, and C4 and the first and second brakes B1 and B2 as described above may be configured by multiple-disk hydraulic friction joining units which are friction-joined by hydraulic pressure.

FIG. 2 is an operation table for each of transmission steps of respective friction elements applied to the planetary gear train according to various embodiments of the present invention.

As illustrated in FIG. 2, in the planetary gear train according to the first exemplary embodiment of the present invention, while three friction elements operate in the respective transmission steps, a transmission is performed.

A forward 1-speed transmission step 1ST is implemented by simultaneously operating the first clutch C1 and the first and second brakes B1 and B2.

A forward 2-speed transmission step 2ND is implemented by simultaneously operating the third clutch C3 and the first and second brakes B1 and B2.

A forward 3-speed transmission step 3RD is implemented by simultaneously operating the first and third clutches C1 and C3 and the second brake B2.

A forward 4-speed transmission step 4TH is implemented by simultaneously operating the second and third clutches C2 and C3 and the second brake B2.

A forward 5-speed transmission step 5TH is implemented by simultaneously operating the first and second clutches C1 and C2 and the second brake B2.

A forward 6-speed transmission step 6TH is implemented by simultaneously operating the first and fourth clutches C1 and C4 and the second brake B2.

A forward 7-speed transmission step 7TH is implemented by simultaneously operating the first, third, and fourth clutches C1, C3, and C4.

A forward 8-speed transmission step 8TH is implemented by simultaneously operating the first and fourth clutches C1 and C4 and the first brake B1.

A forward 9-speed transmission step 9TH is implemented by simultaneously operating the first and second clutches C1 and C2 and the first brake B1.

A forward 10-speed transmission step 10TH is implemented by simultaneously operating the second and fourth clutches C2 and C4 and the first brake B1.

A reverse transmission step REV is implemented by simultaneously operating the fourth clutch C4, and the first and second brakes B1 and B2.

One would appreciate that the numbers shown in FIG. 2 are exemplary and non-limiting.

FIGS. 3 to 13 are transmission diagrams for each transmission step of the planetary gear train according to various embodiments of the present invention. A transmission process of the planetary gear train according to various embodiments of the present invention is illustrated through a lever analysis method.

Referring to FIGS. 3 to 13, a vertical axis of the first planetary gear set PG1 is set to the first rotational shaft TM1, the second rotational shaft TM2, and the third rotational shaft TM3 from the left.

A vertical axis of the second planetary gear set PG2 is set to the first rotational shaft TM1, the fourth rotational shaft TM4, and the fifth rotational shaft TM5 from the left.

A vertical axis of the third planetary gear set PG3 is set to the fifth rotational shaft TM5, the second rotational shaft TM2, and the sixth rotational shaft TM6 from the left.

A vertical axis of the fourth planetary gear set PG4 is set to the seventh rotational shaft TM7, the eighth rotational shaft TM8, and the second rotational shaft TM2 from the left.

Further, a lower horizontal line represents a rotational speed of "0" and an upper horizontal line represents a rotational speed of "1".

In addition, the rotational speed of "1" assumes that a rotational speed of the input shaft IS is "1" and an interval of the vertical lines is set according to each gear ratio (the number of teeth of the sun gear/the number of teeth of the ring gear) of each of the planetary gear sets PG1 to PG4.

Further, since setting of a rotational axis of the vertical line which is set by inter-combinations of the planetary gear sets is, of course, known to those skilled in the art of the planetary gear train, a detailed description thereof will be omitted.

Hereinafter, the transmission process for each transmission step of the planetary gear train according to the first exemplary embodiment of the present invention will be described with reference to FIGS. 2 to 13.

Forward 1-Speed

Referring to FIG. 2, the first clutch C1, and the first and second brakes B2 and B3 are operation-controlled in the forward 1-speed transmission step 1ST.

Figure 3:
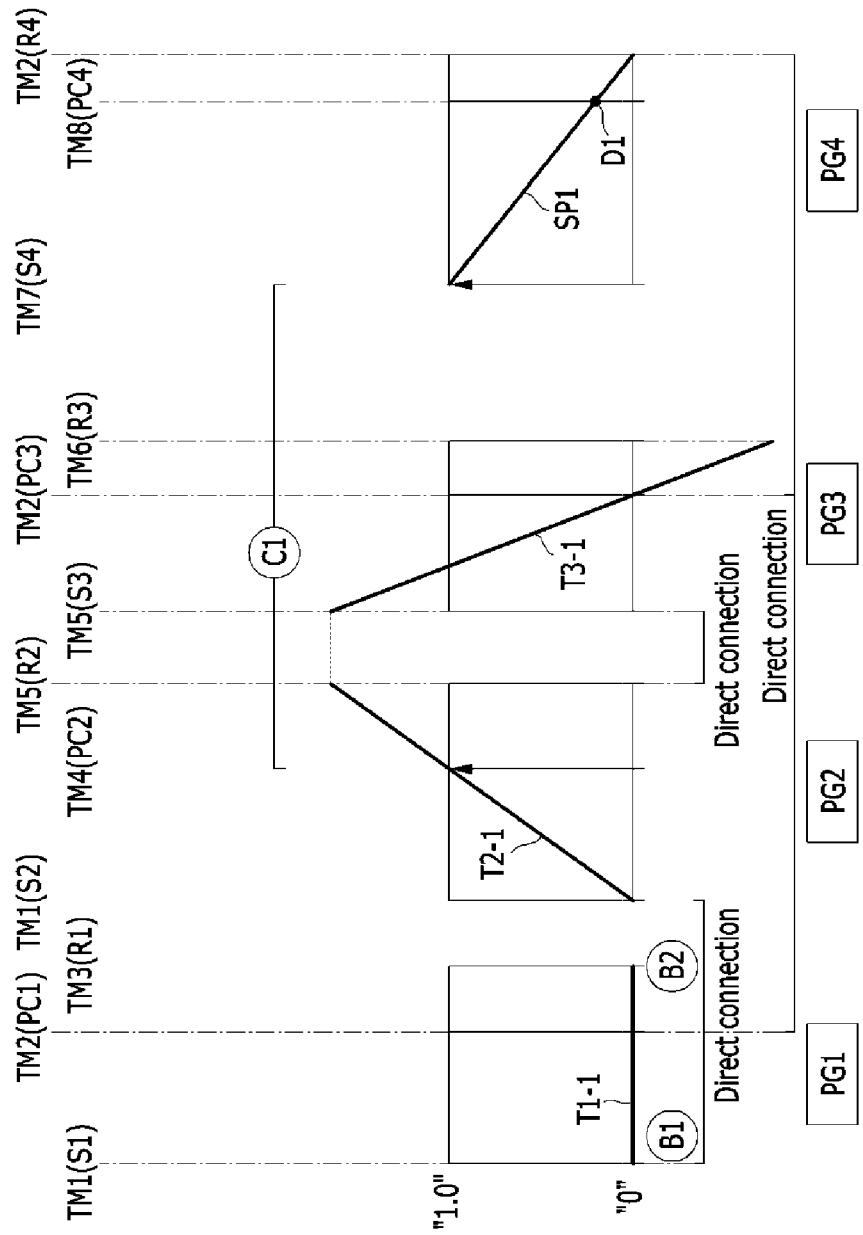
FIG. 3 is a forward 1-speed transmission diagram of an exemplary planetary gear train according to the present invention.

Then, as illustrated in FIG. 3, since the entirety of the first planetary gear set PG1 is fixed by operating the first and second brakes B1 and B2 while an input is made into the fourth rotational shaft TM4, the first, second, and third rotational shafts TM1, TM2, and TM3 operate as the fixation element.

As a result, in the first, second, and third planetary gear sets PG1, PG2, and PG3, the first speed lines T1-1, T2-1, and T3-1 are formed by the inter-complementation operation.

In addition, in the fourth planetary gear set PG4, while the input is made into the seventh rotational shaft TM7 by operating the first clutch C1, the second rotational shaft TM2 operates as the fixation element by fixing the entirety of the first planetary gear set PG1, and as a result, the forward 1-speed transmission which is output as large as D1 is performed through the eighth rotational shaft TM8 which is the output element while a first transmission line SP1 is formed.

That is, in the forward 1-speed, the transmission is performed by an input into the seventh rotational shaft TM7 and the fixation of the entirety of the first planetary gear set PG1.

Forward 2-Speed

In the forward 2-speed transmission step 2ND, an operation of the first clutch C1 that operates in the forward 1-speed is cancelled and the third clutch C3 operates, as illustrated in FIG. 2.

Figure 4:
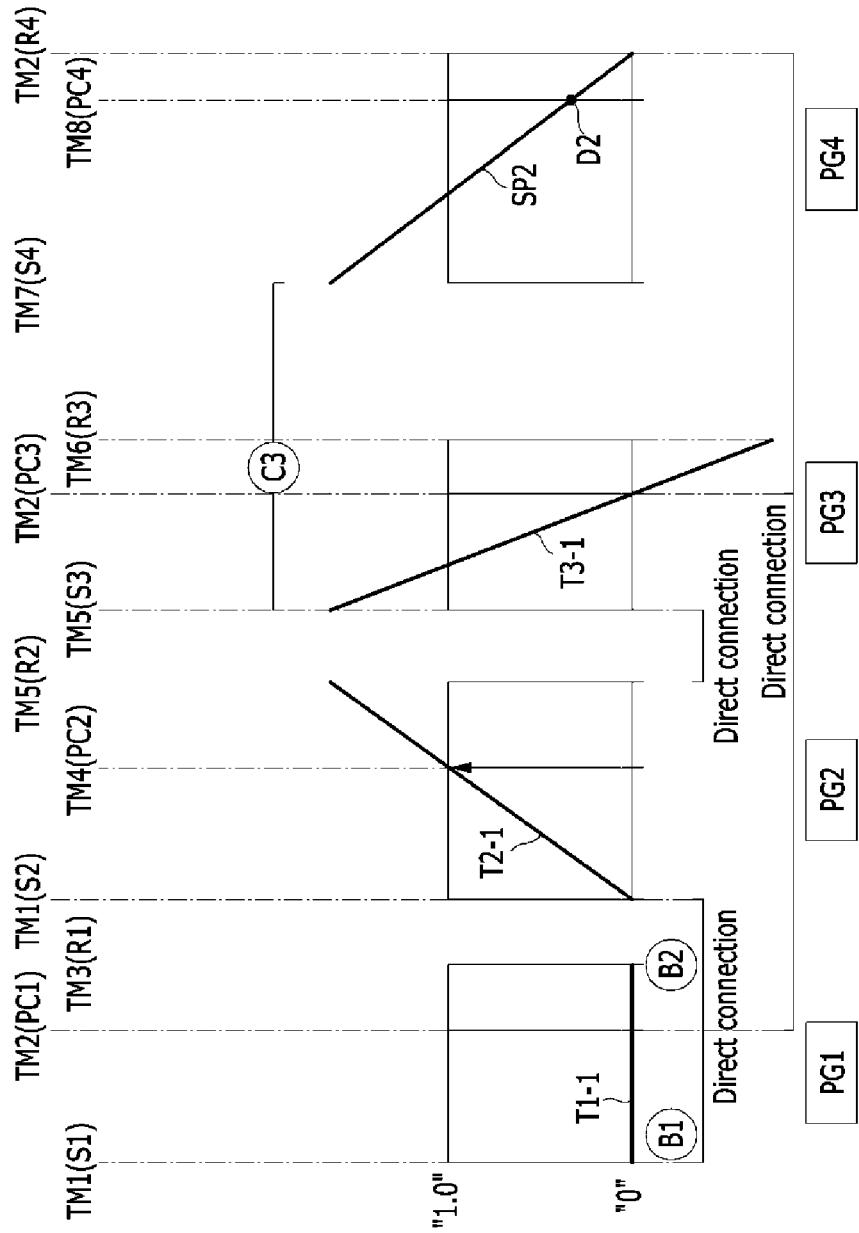
FIG. 4 is a forward 2-speed transmission diagram of an exemplary planetary gear train according to the present invention.

Then, as illustrated in FIG. 4, since the entirety of the first planetary gear set PG1 is fixed by operating the first and second brakes B1 and B2 while the input is made into the fourth rotational shaft TM4, the first, second, and third rotational shafts TM1, TM2, and TM3 operate as the fixation element.

As a result, in the first, second, and third planetary gear sets PG1, PG2, and PG3, first speed lines T1-1, T2-1, and T3-1 are formed by an inter-complementation operation and accelerated rotational power of the fifth rotational shaft TM5 is input into the seventh rotational shaft TM7 by operating the third clutch C3.

In addition, in the fourth planetary gear set PG4, while rotational power of the fifth rotational shaft TM5 is input into the seventh rotational shaft TM7 by operating the third clutch C3, the second rotational shaft TM2 operates as the fixation element by fixing the entirety of the first planetary gear set PG1, as a result, the forward 2-speed transmission which is output as large as D2 is performed through the eighth rotational shaft TM8 which is the output element while a second transmission line SP2 is formed.

Forward 3-Speed

In the forward 3-speed, the operation of the first brake B1 that operates in the forward 2-speed is cancelled and the second clutch C1 operates, as illustrated in FIG. 2.

Figure 5:
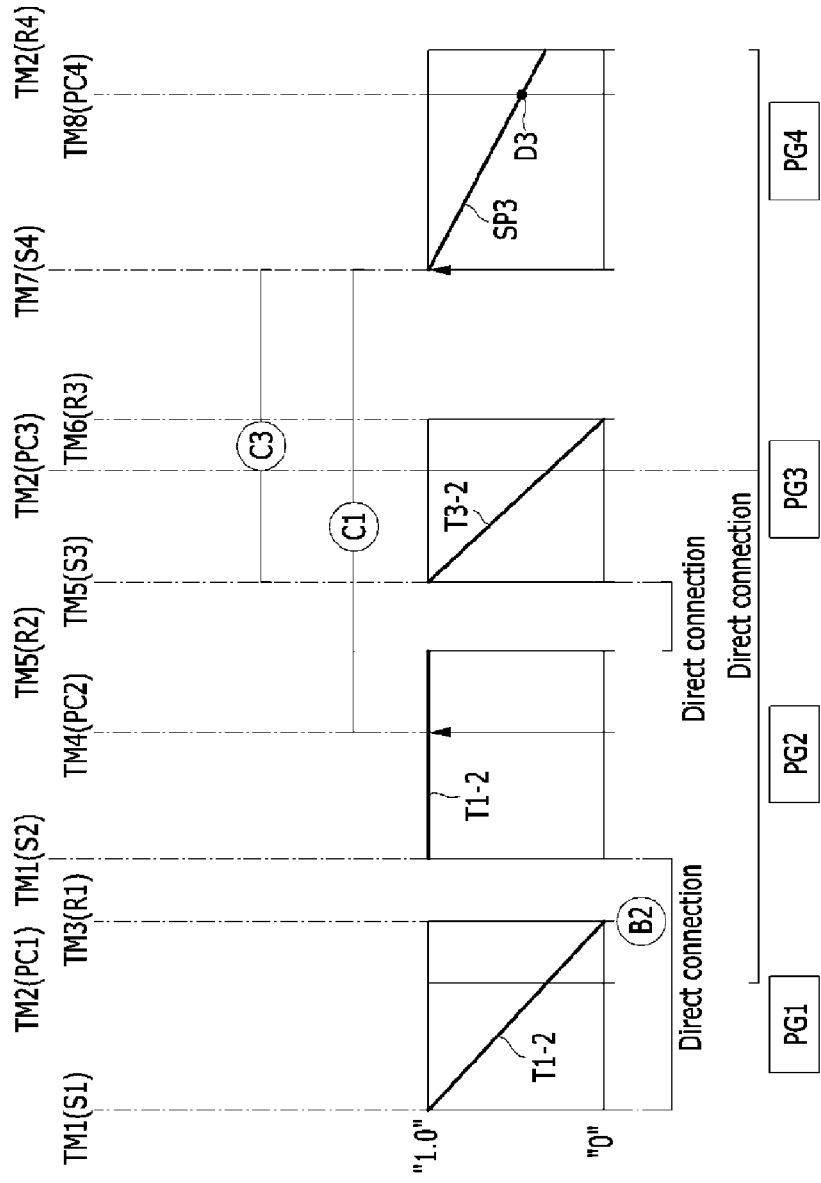
FIG. 5 is a forward 3-speed transmission diagram of an exemplary planetary gear train according to the present invention.

Then, as illustrated in FIG. 5, while the input is made into the fourth rotational shaft TM4, the third rotational shaft TM3 operate as the fixation element by operating the second brake B2.

As a result, in the first, second, and third planetary gear sets PG1, PG2, and PG3, second speed lines T1-2, T2-2, and T3-2 are formed through an inter-complementation operation.

In addition, in the fourth planetary gear set PG4, while the input is made into the seventh rotational shaft TM7 by operating the first clutch C1, a deceleration input is made into the second rotational shaft TM2, and as a result, the forward 3-speed transmission which is output as large as D3 is performed through the eighth rotational shaft TM8 which is the output element while a third transmission line SP3 is formed.

Forward 4-Speed

In the forward 4-speed, the operation of the first clutch C1 that operates in the forward 3-speed is cancelled and the second clutch C2 operates as illustrated in FIG. 2.

Figure 6:
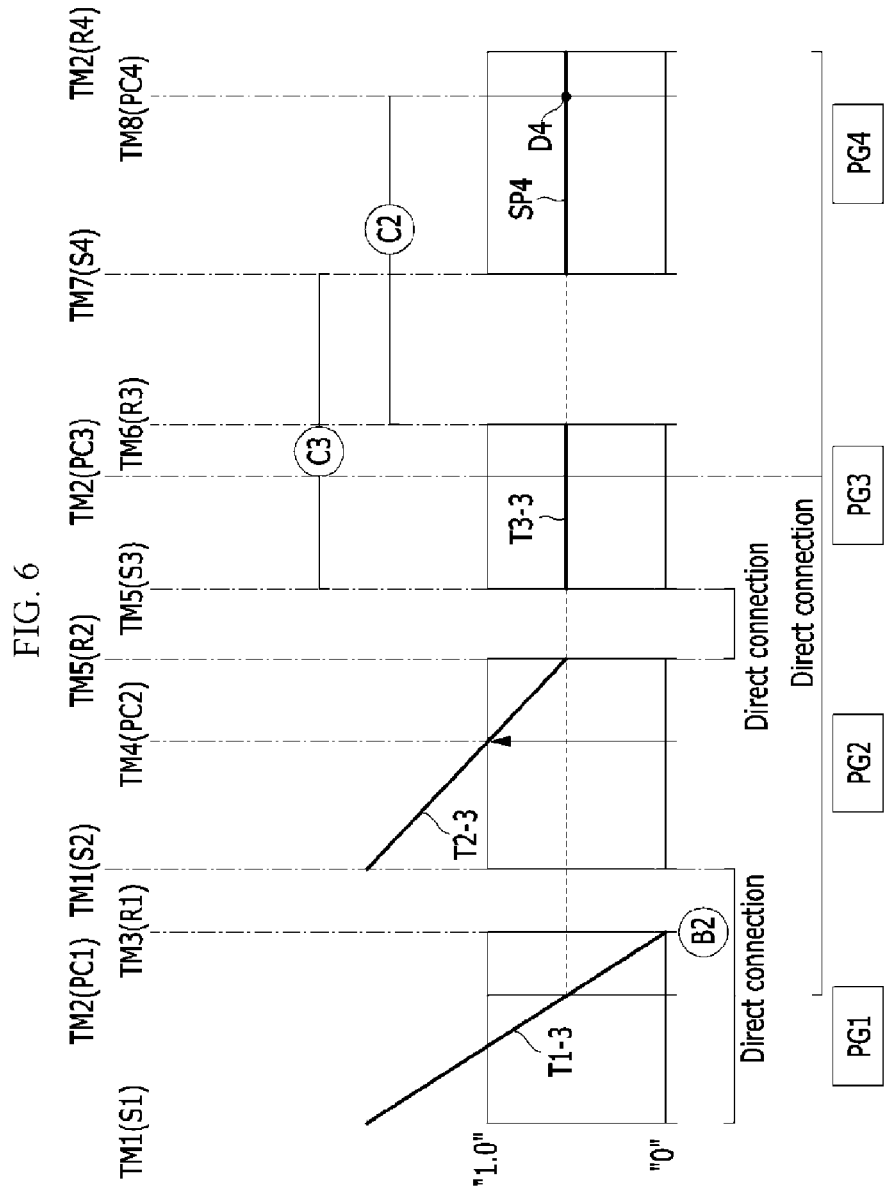
FIG. 6 is a forward 4-speed transmission diagram of an exemplary planetary gear train according to the present invention.

Then, as illustrated in FIG. 6, while the input is made into the fourth rotational shaft TM4, the third rotational shaft TM3 operate as the fixation element by operating the second brake B2.

As a result, in the first, second, and third planetary gear sets PG1, PG2, and PG3, third speed lines T1-3, T2-3, and T3-3 are formed through the inter-complementation operation.

In addition, in the fourth planetary gear set PG4, the same input which has a smaller deceleration ratio than the forward 3-speed is made into the seventh rotational shaft TM7 and the second rotational shaft TM2 by operating the second and third clutches C2 and C3, and as a result, the forward 4-speed transmission which is output as large as D4 is performed through the eighth rotational shaft TM8 which is the output element while a fourth transmission line SP4 is formed.

Forward 5-Speed

In the forward 5-speed, the operation of the third clutch C3 that operates in the forward 4-speed is cancelled and the first clutch C1 operates, as illustrated in FIG. 2.

Figure 7:
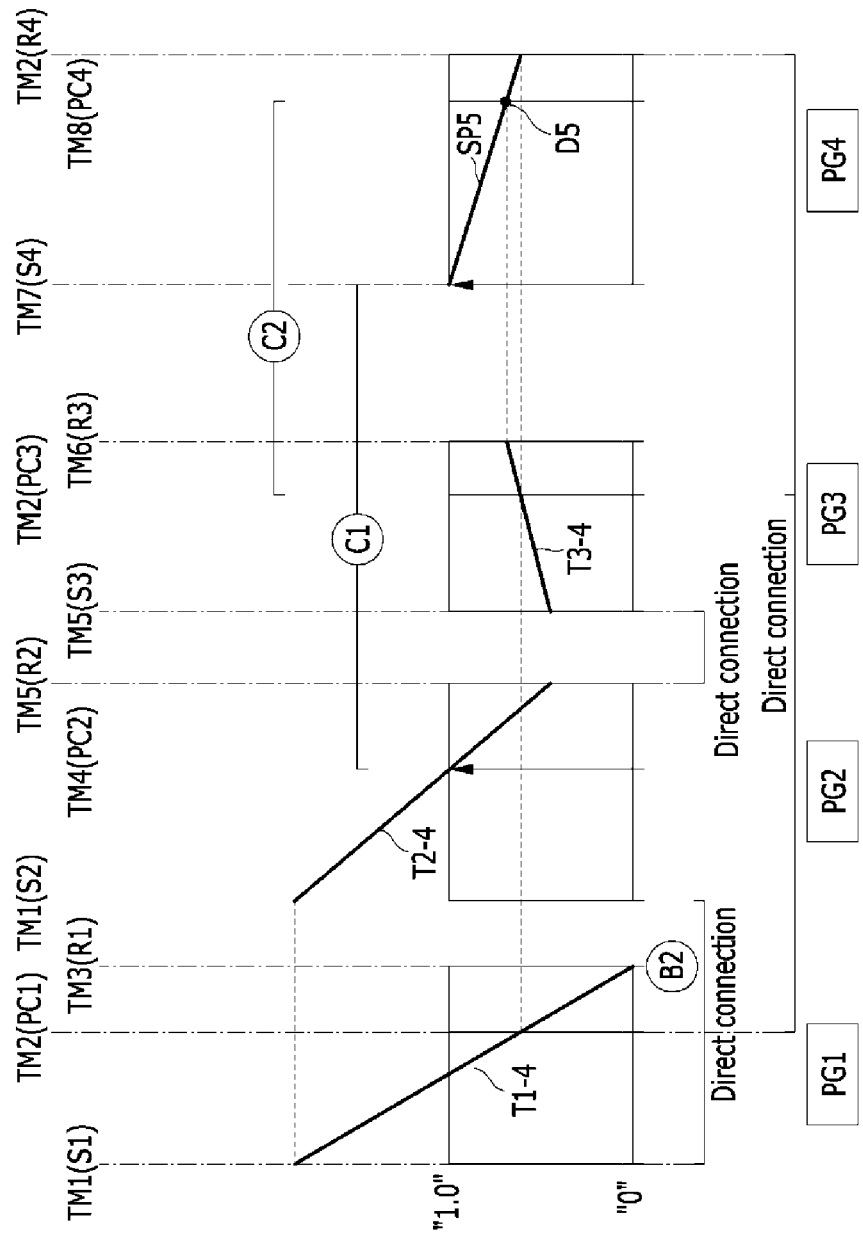
FIG. 7 is a forward 5-speed transmission diagram of an exemplary planetary gear train according to the present invention.

Then, as illustrated in FIG. 7, while the input is made into the fourth rotational shaft TM4, the third rotational shaft TM3 operate as the fixation element by operating the second brake B2.

Further, in the first, second, and third planetary gear sets PG1, PG2, and PG3, fourth speed lines T1-4, T2-4, and T3-4 are formed through the inter-complementation operation.

In addition, in the fourth planetary gear set PG4, rotational power of the input shaft IS is input into the seventh rotational shaft TM7 by operating the first clutch C1 and a deceleration input which has a smaller deceleration ratio than the forward 4-speed is made into the second rotational shaft TM2, and as a result, the forward 5-speed transmission which is output as large as D5 is performed through the eighth rotational shaft TM8 which is the output element while a fifth transmission line SP5 is formed.

Forward 6-Speed

In the forward 6-speed, the operation of the second clutch C2 that operates in the forward 5-speed is cancelled and the fourth clutch C4 operates, as illustrated in FIG. 2.

Figure 8:
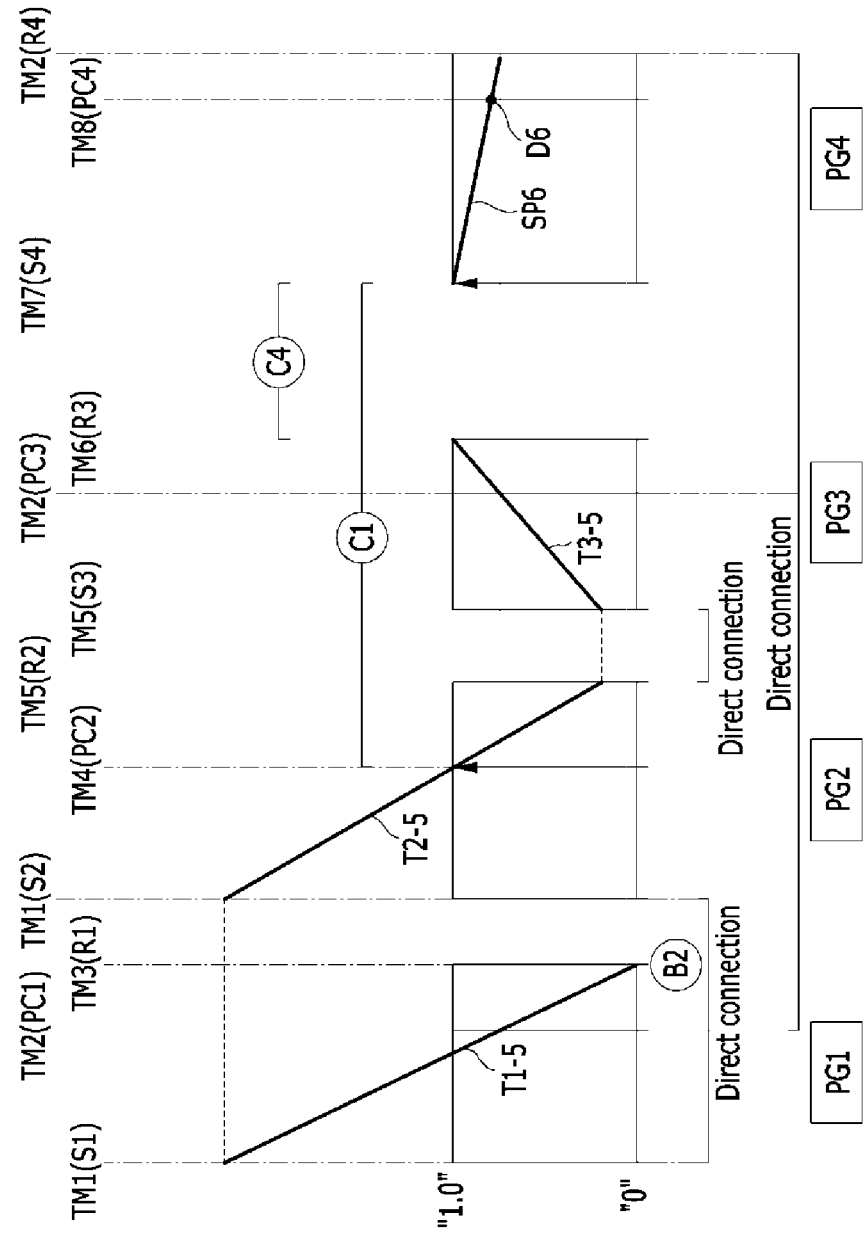
FIG. 8 is a forward 6-speed transmission diagram of an exemplary planetary gear train according to the present invention.

Then, as illustrated in FIG. 8, while the input is made into the fourth rotational shaft TM4, the third rotational shaft TM3 operate as the fixation element by operating the second brake B2.

Further, in the first, second, and third planetary gear sets PG1, PG2, and PG3, fifth speed lines T1-5, T2-5, and T3-5 are formed through the inter-complementation operation.

In addition, in the fourth planetary gear set PG4, the rotational power of the input shaft IS is input into the seventh rotational shaft TM7 by operating the first clutch C1 and a deceleration input which has a smaller deceleration ratio than the forward 5-speed is made into the second rotational shaft TM2, and as a result, the forward 6-speed transmission which is output as large as D6 is performed through the eighth rotational shaft TM8 which is the output element while a sixth transmission line SP6 is formed.

In the forward 3rd, 4th, 5th, and 6th transmission processes, provided is the same condition that the rotational power of the input shaft IS is input into the fourth rotational shaft TM4 and the third rotational shaft TM3 operates as the fixation element by operating the second brake B2 and the reason for being different in the second, third, fourth, and fifth speed lines T1-2 to T1-5, T2-2 to T2-5, and T3-2 to T3-5 is that operation conditions of the first, second, third, and fourth clutches C1, C2, C3, and C4 is selectively connected with the fourth planetary gear set PG4 are different from each other.

Forward 7-Speed

In the forward 7-speed, the operation of the second brake B2 that operates in the forward 6-speed is cancelled and the third clutch C3 operates, as illustrated in FIG. 2.

Figure 9:
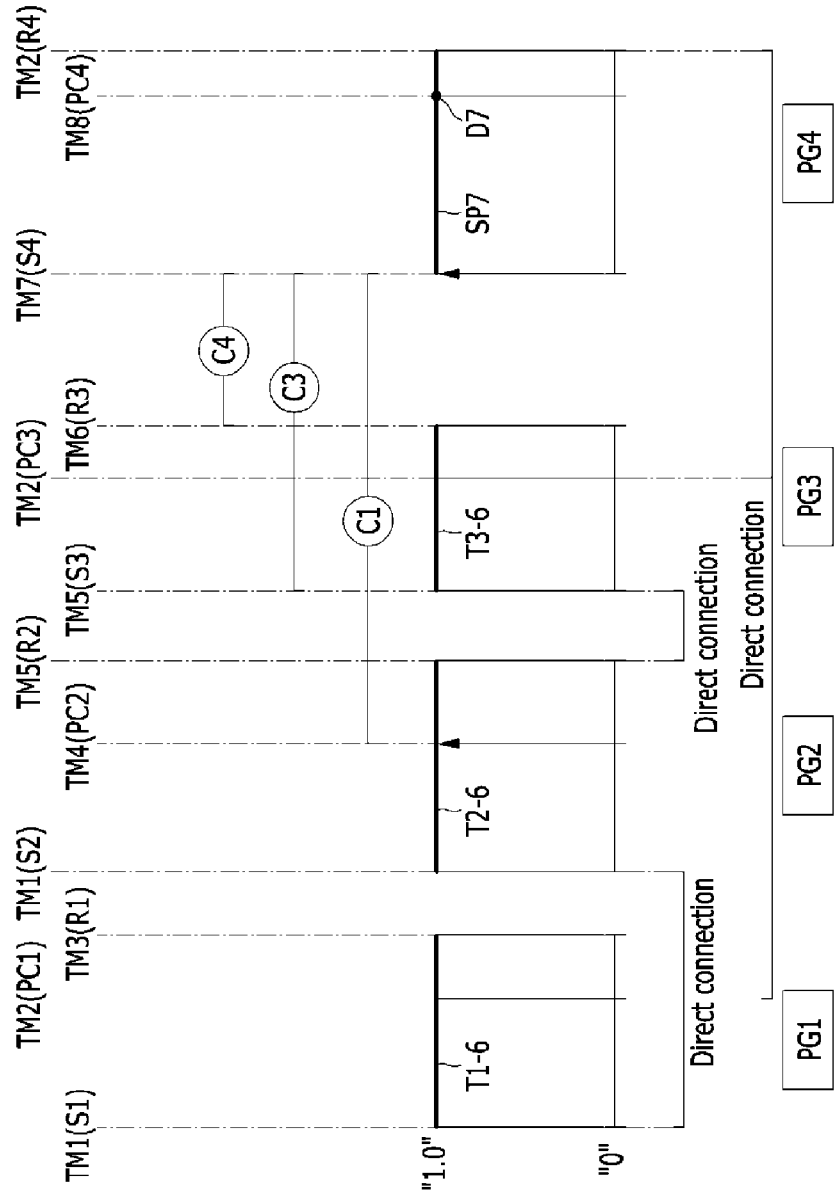
FIG. 9 is a forward 7-speed transmission diagram of an exemplary planetary gear train according to the present invention.

Then, as illustrated in FIG. 9, while the input is made into the fourth rotational shaft TM4, the rotational power of the input shaft IS is input into the seventh rotational shaft TM7 by operating the first clutch C1.

In addition, all of the first, second, and fourth planetary gear sets PG1, PG2, and PG4 are simultaneously directly joined through the inter-complementation operation while the third planetary gear set PG3 is directly joined by operating the third and fourth clutches C3 and C4.

As a result, in the first, second, and third planetary gear sets PG1, PG2, and PG3, the sixth speed lines T1-6, T2-6, and T3-6 are formed and in the fourth planetary gear set PG4, the forward 7-speed transmission which is output as large as D7 is performed through the eighth rotational shaft TM8 which is the output element while a seventh transmission line SP7 is formed.

That is, in the forward 7-speed, provided is a state of 1:1 in which the rotational power of the input shaft IS is output just as it is.

Forward 8-Speed

In the forward 8-speed, the operation of the second clutch C3 that operates in the forward 7-speed is cancelled and the first brake B1 operates, as illustrated in FIG. 2.

Figure 10:
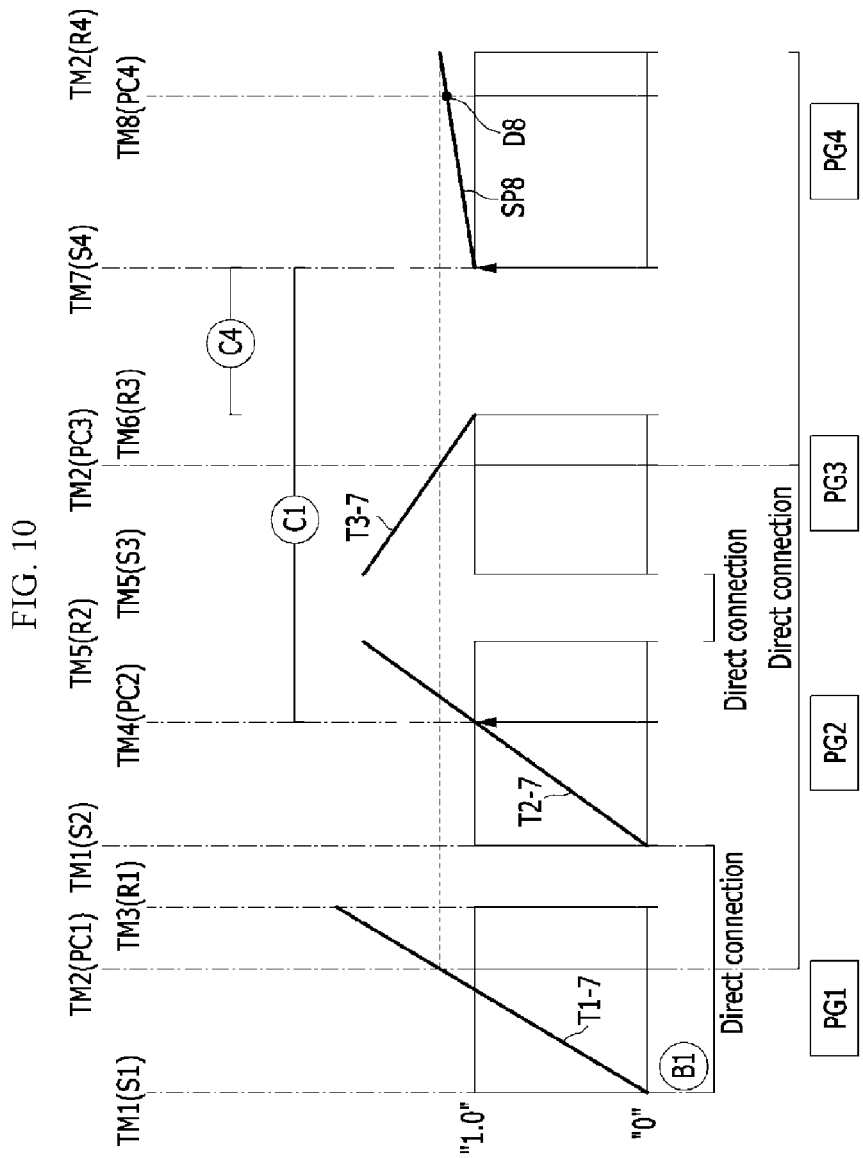
FIG. 10 is a forward 8-speed transmission diagram of an exemplary planetary gear train according to the present invention.

Then, as illustrated in FIG. 10, seventh speed lines T1-7, T2-7, and T3-7 are formed in the first, second, and third planetary gear sets PG1, PG2, and PG3 through the inter-complementation operation while the first rotational shaft TM1 operates as the fixation element by operating the first brake B1 while the input is made into the fourth rotational shaft TM4.

In addition, in the fourth planetary gear set PG4, the rotational power of the input shaft IS is input into the seventh rotational shaft TM7 by operating the first clutch C1 and an input which is more accelerated than the input is made into the second rotational shaft TM2, and as a result, the forward 8-speed transmission which is output as large as D8 is performed through the eighth rotational shaft TM8 which is the output element while an eighth transmission line SP8 is formed.

Forward 9-Speed

In the forward 9-speed, the operation of the fourth clutch C4 that operates in the forward 8-speed is cancelled and the second clutch C2 operates, as illustrated in FIG. 2.

Figure 11:
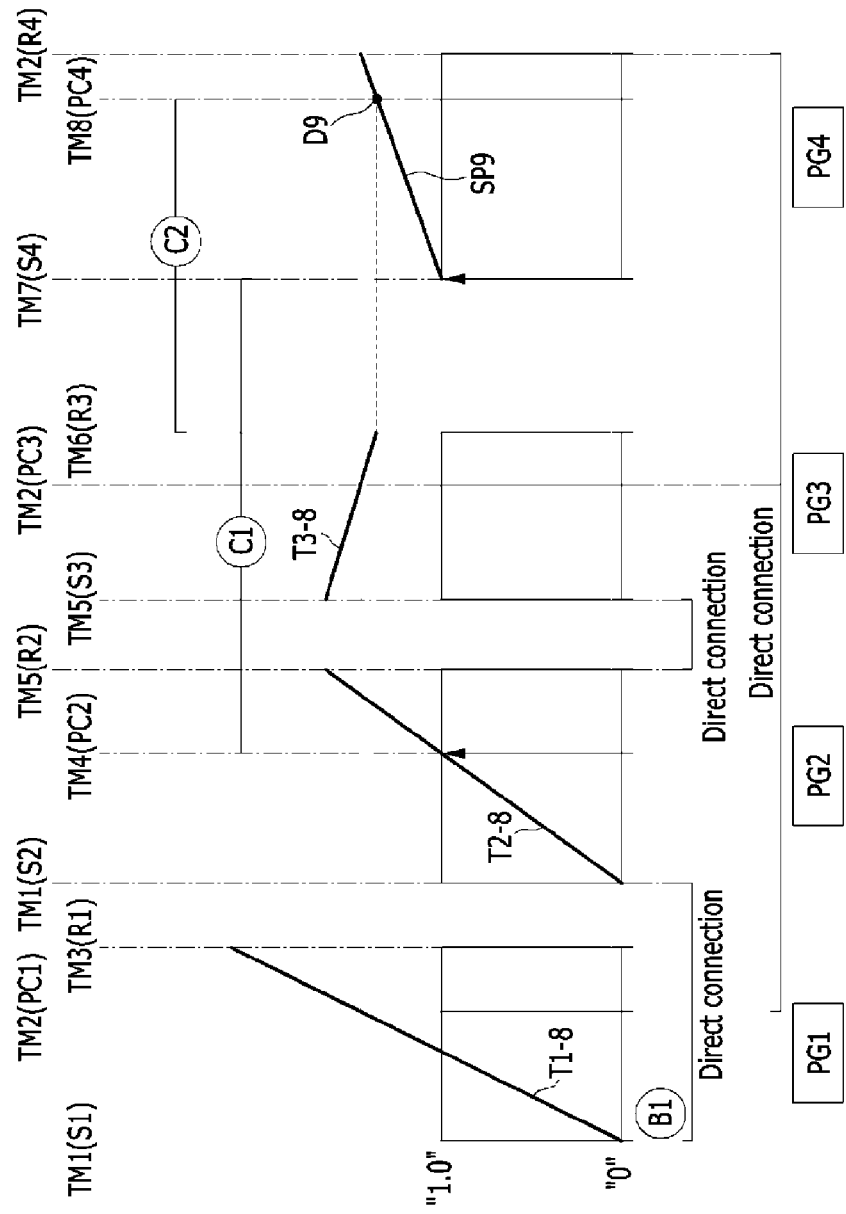
FIG. 11 is a forward 9-speed transmission diagram of an exemplary planetary gear train according to the present invention.

Then, as illustrated in FIG. 11, eighth speed lines T1-8, T2-8, and T3-8 are formed in the first, second, and third planetary gear sets PG1, PG2, and PG3 through the inter-complementation operation while the first rotational shaft TM1 operates as the fixation element by operating the first brake B1 while the input is made into the fourth rotational shaft TM4.

In addition, in the fourth planetary gear set PG4, the rotational power of the input shaft IS is input into the seventh rotational shaft TM7 by operating the first clutch C1 and an input which is more accelerated than the 8-speed is made into the second rotational shaft TM2, and as a result, the forward 9-speed transmission which is output as large as D9 is performed through the eighth rotational shaft TM8 which is the output element while a ninth transmission line SP9 is formed.

Forward 10-Speed

In the forward 10-speed, the operation of the first clutch C1 that operates in the forward 9-speed is cancelled and the fourth clutch C4 operates, as illustrated in FIG. 2.

Figure 12:
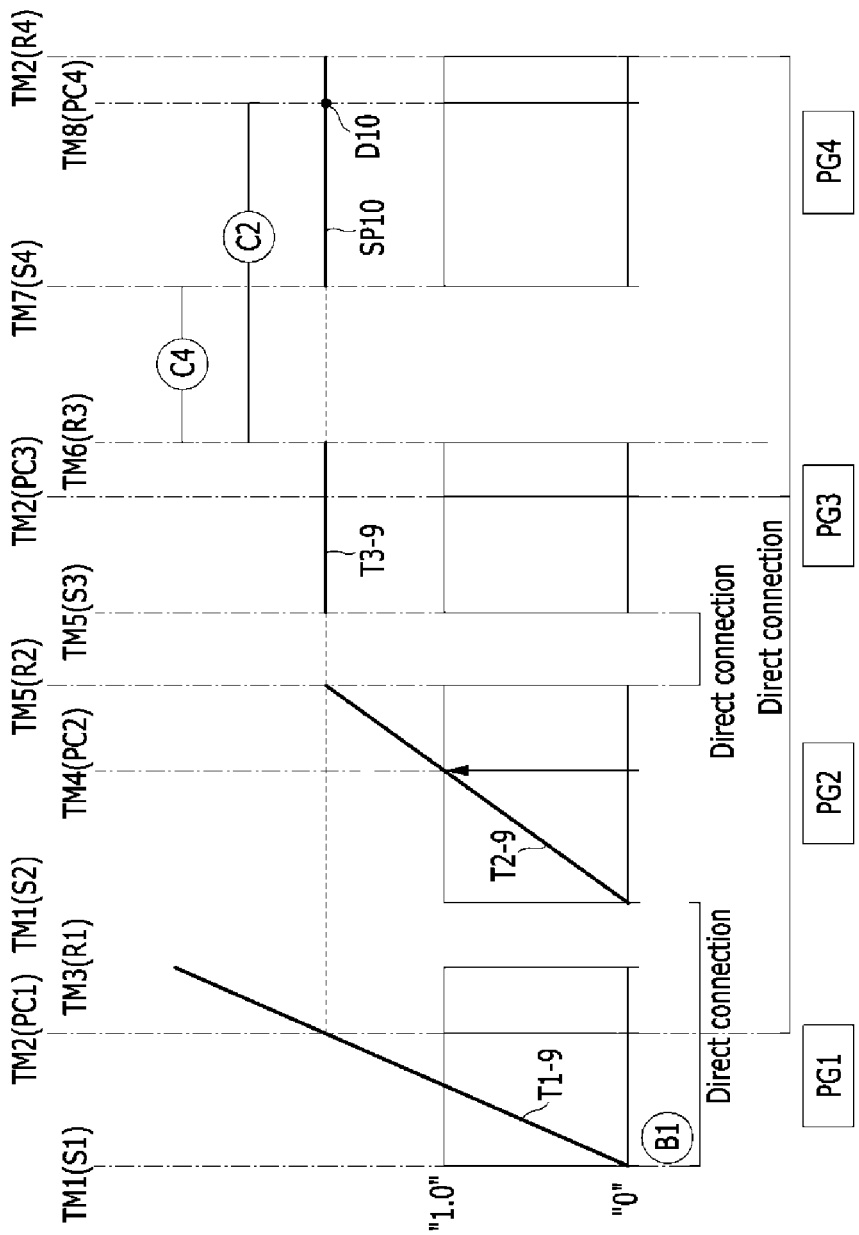
FIG. 12 is a forward 10-speed transmission diagram of an exemplary planetary gear train according to the present invention.

Then, as illustrated in FIG. 12, ninth speed lines T1-9, T2-9, and T3-9 are formed in the first, second, and third planetary gear sets PG1, PG2, and PG3 through the inter-complementation operation while the first rotational shaft TM1 operates as the fixation element by operating the first brake B1 while the input is made into the fourth rotational shaft TM4

In addition, in the fourth planetary gear set PG4, an input which is more accelerated than the forward 9-speed is made as the fourth planetary gear set PG4 is directly joined by operating the second and third clutches C2 and C3, and as a result, the forward 10-speed transmission which is output as large as D10 is performed through the eighth rotational shaft TM8 which is the output element while a tenth transmission line SP10 is formed.

In the forward 8th, 9th, and 10th transmission processes, provided is the same condition that the rotational power of the input shaft IS is input into the fourth rotational shaft TM4 and the first rotational shaft TM1 operates as the fixation element by operating the first brake B1 and the reason for being different in the seventh, eighth, and ninth speed lines T1-7 to T1-9, T2-7 to T2-9, and T3-7 to T3-9 is that the operation conditions of the first, second, third, and fourth clutches C1, C2, C3, and C4 are selectively connected with the fourth planetary gear set PG4 are different from each other.

Reverse

In the reverse transmission step, the first and second brakes B1 and B2 and the fourth clutch C4 operate as illustrated in FIG. 2.

Figure 13:
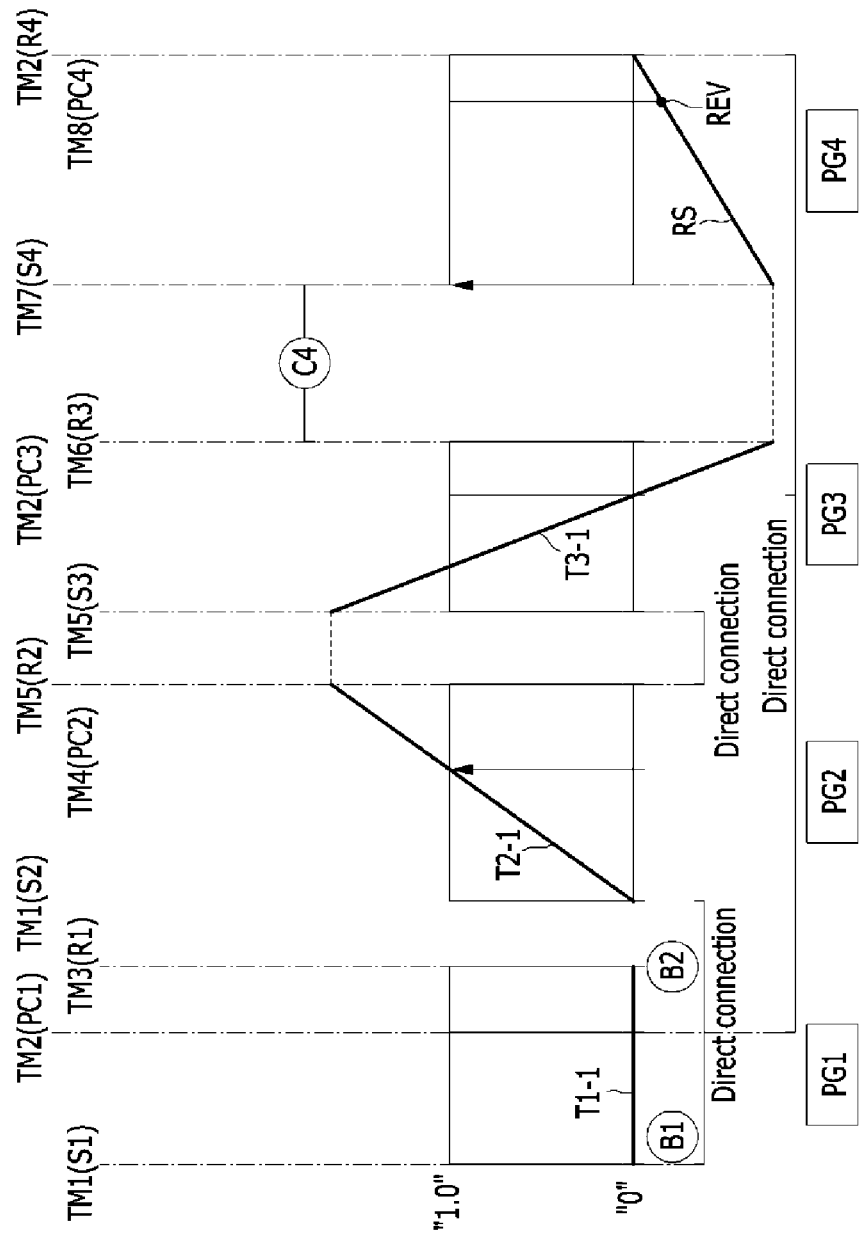
FIG. 13 is a reverse transmission diagram of an exemplary planetary gear train according to the present invention.

Then, as illustrated in FIG. 13, since the entirety of the first planetary gear set PG1 is fixed by operating the first and second brakes B1 and B2 while the input is made into the fourth rotational shaft TM4, the first, second, and third rotational shafts TM1, TM2, and TM3 operate as the fixation element.

As a result, in the first, second, and third planetary gear sets PG1, PG2, and PG3, first speed lines T1-1, T2-1, and T3-1 are formed by the inter-complementation operation and reverse rotational power of the fifth rotational shaft TM5 is input into the seventh rotational shaft TM7 by operating the third clutch C4.

In addition, in the fourth planetary gear set PG4, while the reverse rotational power of the fifth rotational shaft TM5 is input into the seventh rotational shaft TM7, the second rotational shaft TM2 operates as the fixation element by operating the entirety of the first planetary gear set PG1, and as a result, the reverse transmission which is output as large as REV is performed through the eighth rotational shaft TM8 which is the output element while a reverse transmission line RS is formed.

As described above, in the planetary gear train according to various embodiments of the present invention, four planetary gear sets PG1, PG2, PG3, and PG4 may implement the forward 10-speed and reverse 1-speed transmission steps through the operation-control of four clutches C1, C2, C3, and C4 and two brakes B1 and B2. As a result, the planetary gear train according to various embodiments of the present invention may improve the power transmission efficiency and the fuel efficiency through the multistages of the automatic transmission.

In addition, three friction elements operate for each transmission step, and as a result, a friction drag loss is decreased by minimizing the number of friction elements which do not operate, thereby improving the power transmission efficiency and the fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an auto transmission for a vehicle, comprising:
   an input shaft into which power of an engine is input;
   a first planetary gear set including a first sun gear, a first planetary carrier, and a first ring gear;
   a second planetary gear set including a second sun gear, a second planetary carrier, and a second ring gear;
   a third planetary gear set including a third sun gear, a third planetary carrier, and a third ring gear;
   a fourth planetary gear set including a fourth sun gear, a fourth planetary carrier, and a fourth ring gear;
   a first rotational shaft configured to connect the first and second sun gears and selectively connected to a transmission housing;
   a second rotational shaft configured to connect the first and third planetary carriers and the fourth ring gear;
   a third rotational shaft configured to connect the first ring gear and selectively connected to the transmission housing;
   a fourth rotational shaft configured to connect the second planetary carrier and directly connected to an input shaft;
   a fifth rotational shaft configured to connect the second ring gear and the third sun gear;
   a sixth rotational shaft configured to connect the third ring gear;
   a seventh rotational shaft configured to connect the fourth sun gear, and selectively connected with the input shaft and selectively connected to the fifth and sixth rotational shafts;
   an eighth rotational shaft configured to connect the fourth planetary carrier and directly connected with an output shaft and selectively connected with the sixth rotational shaft; and
   six friction elements selectively connecting the rotational shafts and selectively connecting the first and third rotational shafts with the transmission housing.

2. The planetary gear train of claim 1, wherein each of the first, second, third, and fourth planetary gear sets is a single-pinion planetary gear set.

3. The planetary gear train of claim 2, wherein the first, second, third, and fourth planetary gear sets are sequentially disposed on or coupled to the input shaft starting from an engine side.

4. The planetary gear train of claim 1, wherein the sixth friction elements includes:
   a first clutch interposed between the input shaft and the seventh rotational shaft;
   a second clutch interposed between the sixth rotational shaft and the eighth rotational shaft;
   a third clutch interposed between the fifth rotational shaft and the seventh rotational shaft;
   a fourth clutch interposed between the sixth rotational shaft and the seventh rotational shaft;
   a first brake interposed between the first rotational shaft and the transmission housing; and
   a second brake interposed between the third rotational shaft and the transmission housing.

5. The planetary gear train of claim 4, wherein transmission steps implemented by selectively operating the six friction elements include:
   a first forward transmission step implemented by simultaneously operating the first clutch and the first and second brakes;
   a second forward transmission step implemented by simultaneously operating the third clutch and the first and second brakes;
   a third forward transmission step implemented by simultaneously operating the first and third clutches and the second brake;
   a fourth forward transmission step implemented by simultaneously operating the second and third clutches and the second brake;
   a fifth forward transmission step implemented by simultaneously operating the first and second clutches and the second brake;
   a sixth forward transmission step implemented by simultaneously operating the first and fourth clutches and the second brake;
   a seventh forward transmission step implemented by simultaneously operating the first, third, and fourth clutches;
   an eighth forward transmission step implemented by simultaneously operating the first and fourth clutches and the first brake;
   a ninth forward transmission step implemented by simultaneously operating the first and second clutches and the first brake;
   a tenth forward transmission step implemented by simultaneously operating the second and fourth clutches and the first brake; and
   a reverse transmission step implemented by simultaneously operating the fourth clutch and the first and second brakes.

* * * * *